UNITED STATES PATENT OFFICE.

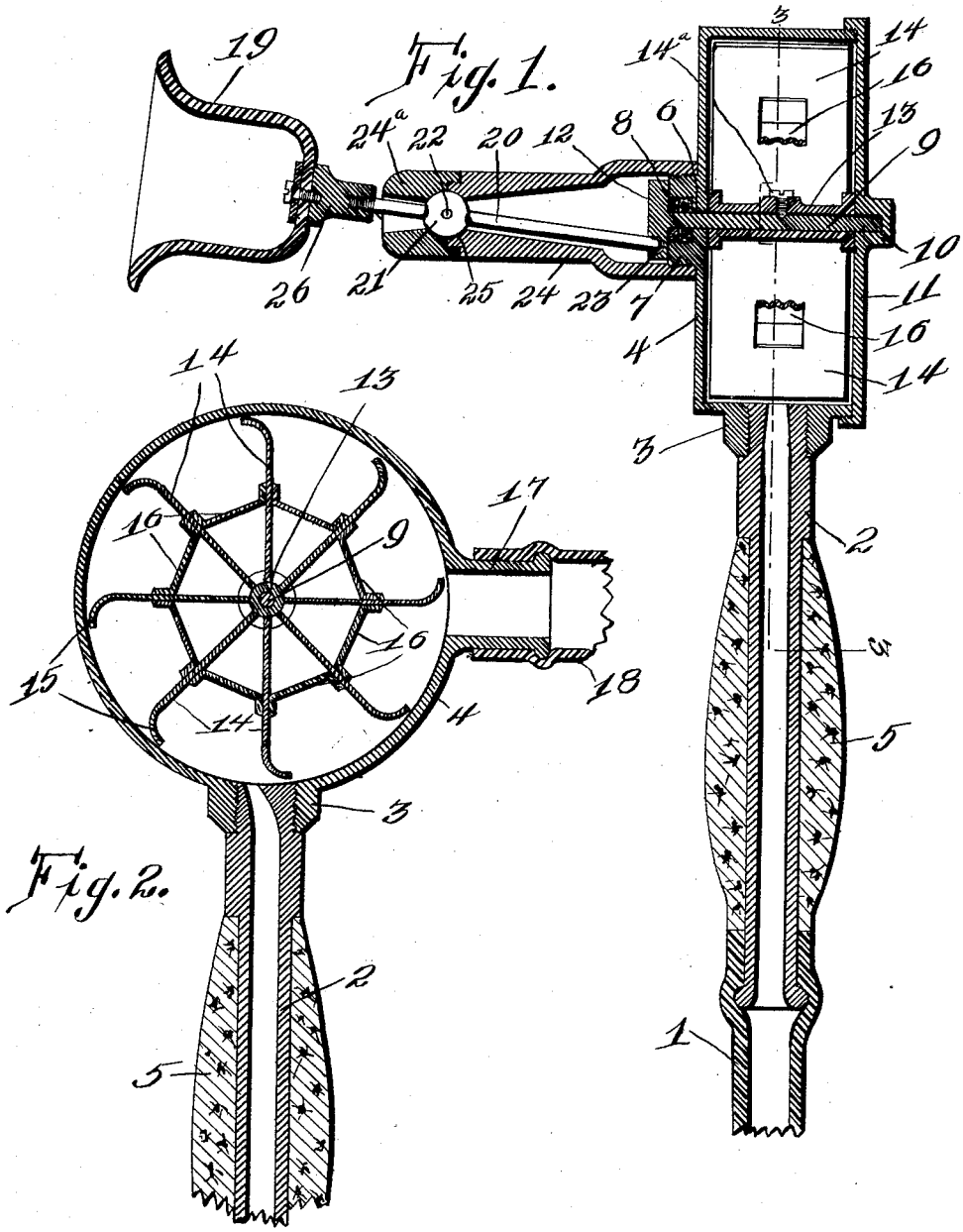

ALVAH A. GRINER, OF CHICAGO, ILLINOIS.

MASSAGE IMPLEMENT.

1,005,024.   Specification of Letters Patent.   Patented Oct. 3, 1911.

Application filed March 30, 1910. Serial No. 552,463.

*To all whom it may concern:*

Be it known that I, ALVAH A. GRINER, a citizen of the United States, residing at Chicago, in the county of Cook and State of Illinois, have invented certain new and useful Improvements in Massage Implements, of which the following is a specification.

My invention relates to a vibratory massage implement, but more particularly to that class of massage implements which are operated by water power.

The principal object of my invention comprehends the production of a device of the above character having a direct connection between the shaft of the motor and the applicator, said connection being so arranged as to transmit an even circular vibratory motion to the applicator.

A further object of my invention is to construct an extremely simple and inexpensive device, which may be easily attached to a faucet in the bath-room, or to any other faucet in the house. When connected to the bath-tub faucet, the implement may be used while the tub is filling, as the water passes through the casing of the motor, and is discharged into the bath-tub through a suitable hose.

Other objects and their resultant advantages will become apparent as the nature of my invention is better understood from the following description and accompanying drawing, in which latter,—

Figure 1 is a vertical sectional view showing my invention complete, and Fig. 2 is a horizontal sectional view taken on the line 3—3 of Fig. 1.

Referring specifically to the drawing, 1 indicates a flexible tube which is connected at one end to the outer end of a rigid tube 2, and is adapted to have its other end connected to the water supply, or faucet. (Not shown.) The inner end of the rigid tube 2 is threaded and is screwed into a threaded opening 3 formed in the side of the motor casing 4. The tube 2 serves as a handle to manipulate the implement, and to enable the user to obtain a firm grip on the handle, the same is provided with a cork hand hold 5.

As shown in Fig. 1, one side of the motor casing 4 is provided with a centrally located opening 6, and a screw threaded extension 7, which latter is provided with a stuffing, or packing box 8, to prevent leakage. Passed horizontally through the stuffing box 8, and the opening 6, is a shaft 9, one end of which is journaled in a suitable boxing 10, formed in the removable cover 11, of the motor casing 4. The other end of the shaft 9 is provided with a disk 12, for a purpose to be hereinafter referred to. Mounted on the shaft 9, within the casing 4, is a hub 13, to which the blades 14 of the water wheel are attached. The hub 13 is held from rotating on the shaft 9, by means of a set screw 14$^a$, and is adapted to have its ends fit snugly against the adjacent walls of the motor casing and its cover. The outer ends of the blades 14 of the water wheel are turned, as at 15, and for the purpose of rigidity the blades have braces 16 fastened thereto intermediate their ends.

By referring to Fig. 2, it will be noted that the opening of the tube 2, at its mouth, is turned and reduced so as to direct the course of the water, coming through the tube, against the sides of the blades 14, near their curved ends, thereby increasing the power and speed of the water wheel. The water is let out of the motor casing 4 through a nipple 17 formed on one side of the casing, at right angle to the inlet tube 2. Connected to the nipple 17 is a flexible conduit 18, through which the water is discharged into the bath-tub, or other receptacle. As shown, the diameter of the nipple 17 is considerably larger than that of the inlet tube 2, so as to allow the water to pass freely out of the casing 4, and not impede the rotation of the water wheel.

As above stated, the hub 13 of the water wheel is fixed to the shaft 9, and consequently said shaft 9 will rotate with the water wheel. The means for converting the rotary motion of the shaft to the circular motion of the applicator 19, comprise an arm 20, having a ball 21 fixed thereto, near its outer end, by means of a transverse pin 22, or in any other suitable manner, and having its inner end loosely mounted in a pocket 23 formed in the under side of the disk 12, at a suitable distance from its geometric center. Screwed to the threaded extension 7, of the motor casing 4, is a hollow stem 24, in the lower end of which is formed one half of the socket 25 for receiving the ball 21, the other half of the socket being formed in the removable end piece 24$^a$. The ball and socket joint not only permits the arm 20 to move freely, but at the same time securely holds the arm in position with its inner end in the socket 23. As will be seen, by referring to Fig. 1, the vertical center of the ball 21 is on a line with the center of the disk 12, while the pocket 23, as above stated, is off center. Obviously, then, with the inner end of the arm 20 in the pocket 23, and the ball 21 in the socket 25, the rotation of the disk 12 will cause the ends of the arm to travel in a complete circle. Fixed to the outer end of the arm 20, is a head 26 to which is fastened the applicator 19, above referred to.

From the foregoing, it will be seen that I provide a massage implement having only a few parts, but which is strong and durable, and will admirably serve the purpose for which it is intended.

I claim:

In a vibratory massage implement, the combination of a casing having an opening at one side thereof, and provided with a circular and externally threaded extension having a bore surrounding the outer end of said opening, a shaft journaled in said casing and having one end thereof projecting outwardly through said opening and the bore of said projection, a disk formed upon said end of said shaft and abutting the face of said projection whereby to close the said bore thereof and form a stuffing box, packing within said box around the shaft, a sleeve having its inner end internally threaded to connect upon said projection, and provided with an internal socket, an arm having an intermediate ball disposed in said socket and having its inner end eccentrically connected to said disk, an applicator secured to the outer end of said arm, and means within the casing whereby to rotate the shaft, said means being secured upon said shaft to prevent longitudinal movement of the shaft and hold the disk against said projection.

In testimony whereof I affix my signature in presence of two witnesses.

ALVAH A. GRINER.

Witnesses:
ARTHUR WESLEY,
PETER JONESKU.

---

Copies of this patent may be obtained for five cents each, by addressing the "Commissioner of Patents, Washington, D. C."